United States Patent [19]

Vry et al.

[11] Patent Number: 5,288,987
[45] Date of Patent: Feb. 22, 1994

[54] AUTOFOCUSING ARRANGEMENT FOR A STEREOMICROSCOPE WHICH PERMITS AUTOMATIC FOCUSING ON OBJECTS ON WHICH REFLECTIONS OCCUR

[75] Inventors: Uwe Vry, Aalen; Christian Lücke; Ulrich Sander, both of Oberkochen; Werner Müller, Essingen; Joachim Luber, Essingen; Klaus Knupfer, Essingen; Thomas Hellmuth, Oberkochen; Rüdiger Duchateau, Aalen-Unterkochen; Hartmut Wolf, Oberkochen, all of Fed. Rep. of Germany

[73] Assignee: Carl-Zeiss-Stiftung, Heidenheim, Fed. Rep. of Germany

[21] Appl. No.: 950,460

[22] Filed: Sep. 24, 1992

[30] Foreign Application Priority Data

Sep. 24, 1991 [DE] Fed. Rep. of Germany ....... 4131737

[51] Int. Cl.$^5$ .............................................. G01J 1/20
[52] U.S. Cl. ................................ 250/201.3; 359/376
[58] Field of Search .................. 250/201.3, 201.4, 561, 250/216, 201.5–201.8; 359/376–379, 368, 383; 356/1, 375

[56] References Cited

U.S. PATENT DOCUMENTS

| | | | |
|---|---|---|---|
| 4,356,392 | 10/1982 | Wittekock et al. | 250/201.3 |
| 4,412,127 | 10/1983 | Imai | 250/204 |
| 4,447,717 | 5/9184 | Nohda | 250/201.3 |
| 4,516,840 | 5/1985 | Nakahashi et al. | |
| 4,843,228 | 6/1989 | Nakamura | 250/201.4 |
| 4,912,496 | 3/1990 | Tamada et al. | 250/201.4 |

Primary Examiner—Michael Messinger
Attorney, Agent, or Firm—Walter Ottesen

[57] ABSTRACT

The invention relates to a high-precision autofocusing arrangement for a stereomicroscope wherein a bar-shaped marking is projected via a cylinder optic on an object. The imaged bar-shaped marking is at least in one dimension less or equal to the resolution of the viewing beam path. A region of the objective not used optically is selected for projection as the pass-through pupil.

16 Claims, 4 Drawing Sheets

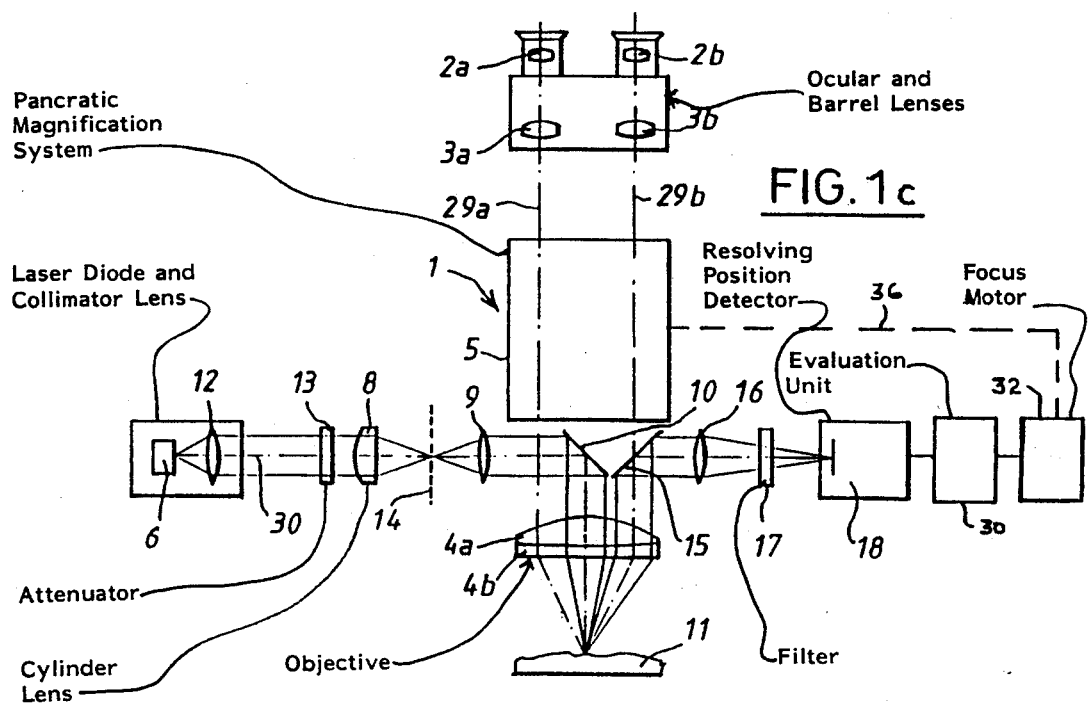

Two-Dimensional CCD-Array

Linear CCD-Array

AUTOFOCUSING ARRANGEMENT FOR A STEREOMICROSCOPE WHICH PERMITS AUTOMATIC FOCUSING ON OBJECTS ON WHICH REFLECTIONS OCCUR

BACKGROUND OF THE INVENTION

U.S. Pat. No. 4,516,840 discloses an arrangement for determining the in-focus condition of a stereomicroscope. In this arrangement, the image of an illuminated marking is projected on an object via one of the two viewing beam paths. In the second viewing beam path, the beam reflected from the object is coupled out via a corresponding divider mirror and deflected onto a photoelectric transducer element. This photoelectric transducer element generates a control signal for the motorized focusing in dependence upon the position of the registered reflecting beam.

The imaging of a marking via the viewing optics is disadvantageous in an arrangement of this kind. A diaphragm of any desired form is imaged on the object with the lateral dimensions of the imaged marking being greater than the resolving capability of the objective. This situation gives rise to difficulties if the surface of the viewed object has regions of an intensely different reflectivity. This is, for example, often the case in surgical microscopes. Here, the marking reflected or projected onto the photoelectric transducer element has such a reflection structure under certain circumstances. Accordingly, difficulties result during the reliable evaluation of the position of the reflected marking on the photoelectric transducer element.

If, in contrast, a marking is imaged which is at least in one dimension less than the resolving capability of the objective, then no reflection structure is registered in the image of the reflected beam on the photoelectric transducer element; however, when imaging, only a marking of very weak intensity is imaged on the object.

Accordingly, if it is desired to equip a surgical microscope having a brightly illuminated viewing field with such a device, then significant problems occur for the detection of the projected marking since the contrast differences on the brightly illuminated object are slight. The use of a laser as the imaging light source has, in addition, the consequence that for an expanded light marking on the object, so-called speckles or uncontrolled interference phenomena on the photoelectric transducer element make the evaluation as difficult as the reflection phenomena described above. If for this reason, a correspondingly narrow diaphragm is imaged, then here too intensity problems on the brightly illuminated object result as described above.

SUMMARY OF THE INVENTION

It is an object of the invention to provide an autofocusing arrangement for a stereomicroscope which permits automatic focusing on objects on which reflections occur.

The autofocusing arrangement of the invention is for a stereomicroscope defining first and second viewing beam paths for viewing an object through an objective by utilizing only a selected region thereof leaving a remaining region thereof unused for the purpose of viewing the object via said beam paths. The autofocusing arrangement includes: light source means for supplying a projection beam defining a projection beam path; optical means for imaging the projection beam as a bar-shaped marking image through the objective at the remaining region thereof and onto the object with at least one dimension having limited diffraction whereupon the projection beam is reflected from the object along one of the viewing beam paths; outcoupling means arranged in the one viewing beam path for coupling the reflected projection beam out of the one viewing beam path; a light-sensitive resolving position detector arranged downstream of the outcoupling means and including a plurality of elements producing a plurality of signals, respectively, indicative of a shift of the bar-shaped marking image and a defocusing of the stereomicroscope; an evaluation unit for converting the signals into a drive signal for refocusing the stereomicroscope; and, focusing motor means for refocusing the stereomicroscope in response to the drive signal.

An essential feature of the invention is the imaging of a thin, bar-shaped marking on the viewed object surface with the projection beam path not being coincident with one of the two viewing beam paths. For this purpose, a beam, preferably from a laser diode, is imaged via a collimator lens and a cylinder lens as a thin bar-shaped marking and this marking is projected via a further lens and a deflecting device through the objective and onto the object. Here, the viewing beam path is not used for projection; instead, and according to the special application of such a stereomicroscope, another pass-through pupil is selected for the projection beam path through the objective.

The imaging of the light beam through a cylinder lens as a thin bar-shaped marking ensures that the thin bar-shaped marking is projected with maximum intensity on the illuminated object; that is, no intensity reduction results as with mask imaging where only a low percentage of the intensity supplied by the light source reaches the object surface. The registration of the reflected bar-shaped marking is correspondingly easier or more advantageous on the resolving position detector for a brightly illuminated microscope viewing field.

In addition, the width of the projected bar-shaped marking can be made smaller or equal to the resolution of the viewing beam path by correspondingly dimensioning the cylinder optic. Two points on the object, which lie within the bar width, can no longer be separately resolved during viewing through the objective. No interference phenomena such as speckles result which are caused by wave trains which are transmitted from points having connecting lines which lie perpendicularly to the projected bar-shaped marking. The resulting interference pattern caused by wave trains, which are transmitted by points along the reflected bar-shaped marking, results in a line pattern on the resolving position detector which is perpendicular to the imaged bar-shaped marking. Such interference fringes can be equalized during evaluation by means of averaging over the longitudinal dimension of the image of the bar-shaped marking on the position detector.

The detection of the bar-shaped marking projected on the object is made via one of the two stereo beam paths where the reflected beam is coupled out rearward of the objective and is projected on a position-resolving position detector. Here, a lateral shift on the resolving position detector is generated by defocusing. This lateral shift is registered and is used for refocusing with the aid of the focus motor.

In a first advantageous embodiment, the projection of the light beam takes place through the center of the objective used which is then especially advantageous when no migration of the projected bar-shaped marking should occur during defocusing.

In a second embodiment of the autofocusing arrangement of the invention, the light beam is projected through a region on the periphery of the objective with the peripheral region being in proportion to the viewing beam path, which serves to detect the reflected beam, such that the connection between the centers of the two pass-through pupils have a maximum possible base length. The larger this base length is selected, the more precise will the autofocusing arrangement operate. This arrangement of projection and detection beam path is advantageous for some applications since the space below the center of the objective is then available for various additional auxiliary means. This can, for example, be the case when the arrangement of the invention is used in a surgical microscope and auxiliary means are mounted thereon.

BRIEF DESCRIPTION OF THE DRAWINGS

The invention will now be described with reference to the drawings wherein:

FIG. 1c corresponds to the embodiment of FIG. 1a except that the focus motor is adapted to effect a displacement of the complete stereomicroscope;

DESCRIPTION OF THE PREFERRED EMBODIMENTS OF THE INVENTION

Figure 1A:
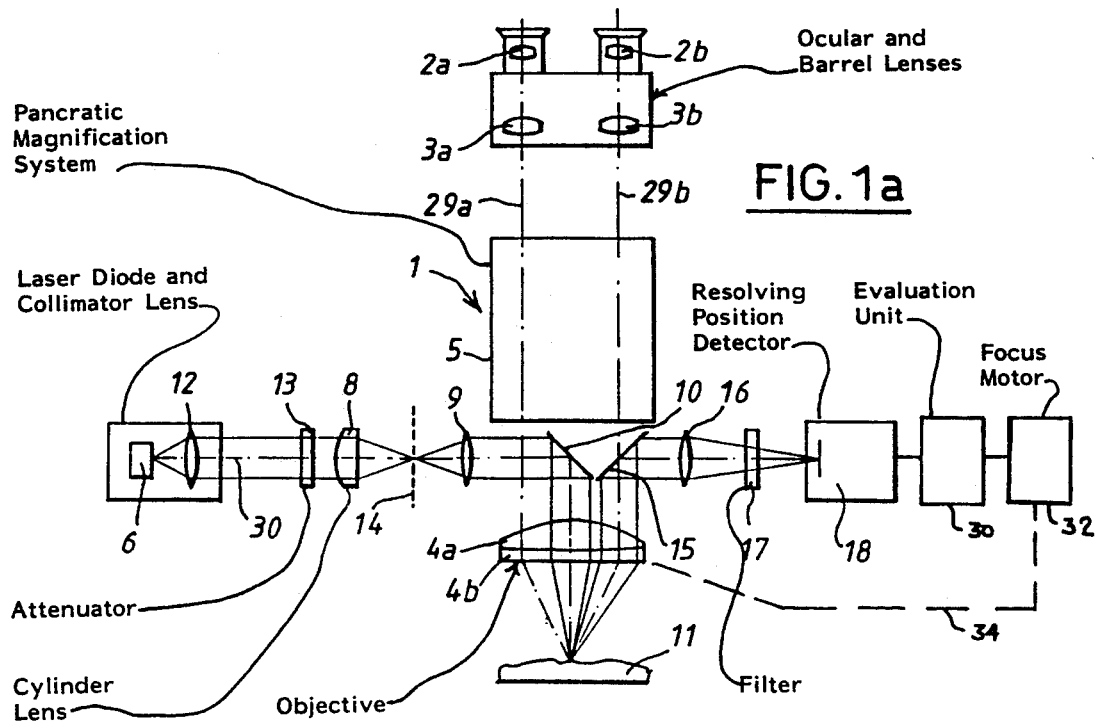
FIG. 1a is a schematic of a first embodiment of the autofocusing arrangement of the invention in a stereomicroscope.

FIG. 1a shows a configuration of the autofocusing arrangement according to the invention. The front view of a stereomicroscope 1 is shown which is equipped with the autofocusing arrangement according to the invention.

The essential components of the stereomicroscope 1 are schematically shown and include the ocular lenses (2a, 2b), barrel lenses (3a, 3b), pancratic magnification system 5, and the objective (4a, 4b) used for both viewing beam paths. These components are shown only schematically since they are not essential to the invention. The use of a complex assembled objective is also possible at any time. The optical axes (29a, 29b) of the two stereoscopic viewing beam paths are also shown.

The autofocusing arrangement of the invention includes a laser diode 6 and a collimator lens 12 on the transmitting end. The optical axis of the projection beam path is identified by reference numeral 30 in FIG. 1a. This arrangement supplies a beam of parallel rays (parallel beam) and is available in integrated form as a complete component. For this purpose, the laser diode HL 7806 of HITACHI can be used and includes the corresponding beam processing optic. The parallel beam passes through an attenuator 13 mounted downstream which can possibly be required in the event that light-sensitive objects are investigated which can be damaged by the high intensity of the impinging laser radiation.

Alternatively, the intensity control can take place even without this attenuator 13 if the intensity of the laser radiation is controlled directly via the current to the laser diode 6. The parallel beam is imaged in the focal plane 14 of the cylinder lens 8 as a thin bar-shaped marking by the cylinder lens 8 arranged downstream. The imaging of this thin bar-shaped marking on the object surface 11 of interest is achieved by the objective (4a, 4b) via a further lens 9 as well as deflecting element 10. A suitable mirror or even an appropriate prism can be used, for example, as the deflecting element 10.

In one of the two stereo viewing beam paths, the laser beam reflected from the object surface 11 is decoupled out of the viewing beam path at the receiving end after passing the objective (4a, 4b) via an outcoupling element 15 and is imaged via a further projection lens 16 and a wavelength-dependent filter 17 on a resolving position detector 18. Conventional two-dimensional CCD-arrays or CCD-lines having several individual elements are commercially available and constitute the resolving position detector 18.

With a defocusing, a lateral shift of the image of the bar-shaped marking occurs on the position detector 18. This lateral shift is registered via an evaluation unit 30 and is used as a control signal for refocusing for a focus motor 32. The focusing can then take place via a motorized variation of the focus intercept of the objective used. The broken line 34 schematically represents a mechanical connection between the focus motor 32 and the objective (4a, 4b) for effecting a change in the focus intercept thereof. On the other hand, the complete stereomicroscope 1 can be driven by a motor along the optical axis as shown in FIG. 1c wherein the broken line 36 schematically represents a mechanical connection between the focus motor 32 and the complete microscope.

Figure 1B:
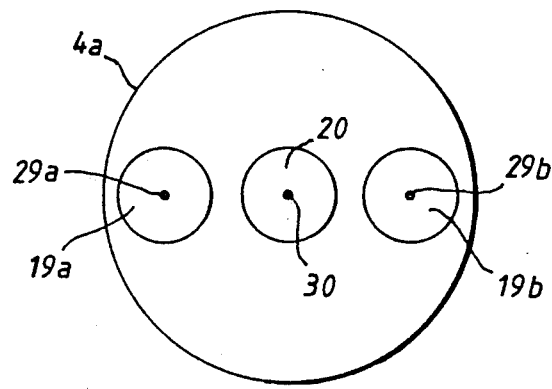
FIG. 1b is a plan view showing the objective used and the corresponding beam paths of the first embodiment.

In the embodiment shown, the projection of the bar-shaped marking takes place through the center of the objective (4a, 4b) used. This is made clear in FIG. 1b wherein the two pass-through pupils (19a, 19b) of the two viewing beam paths as well as the pass-through pupil of the projection beam path 20 are shown in plan view on the objective (4a, 4b). The optical axes of the two stereoscopic viewing beam paths (29a, 29b) as well as the optical axis 30 of the projection beam path 20 are likewise shown.

In addition to the advantages because of the projection of the bar-shaped marking via the cylinder lens 8 already described, the central projection through the objective center affords certain advantages in this embodiment. For example, during defocusing, no migration of the projected bar-shaped marking on the surface 11 need be expected. This is ensured by the perpendicular projection.

Figure 2A:
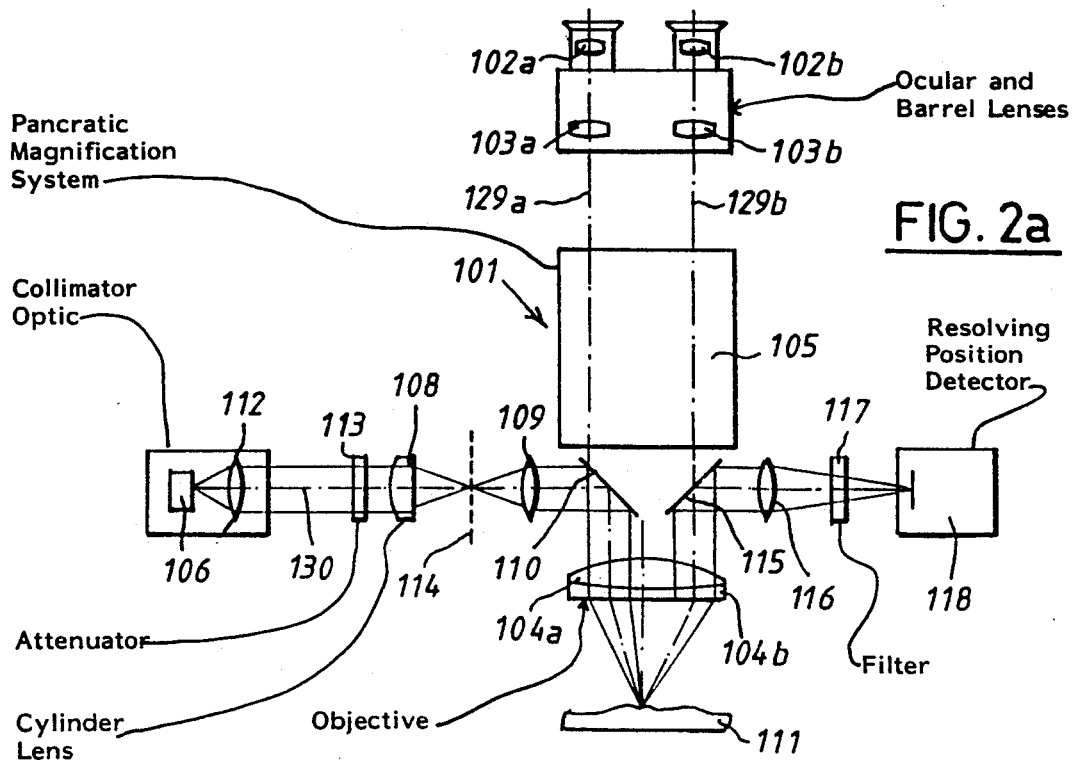
FIG. 2a is a schematic of a second embodiment of the autofocusing arrangement mounted in a stereomicroscope.

A second embodiment of the autofocusing arrangement of the invention is shown in FIG. 2a. In this embodiment, the stereomicroscope 101 basically has the same configuration as in the embodiment of FIG. 1a. The ocular tubes of the ocular lenses (102a, 102b) and the barrel lenses (103a, 103b), the pancratic magnification system 105 and the two-part objective (104a, 104b) for both viewing beam paths are likewise used. The optical axes of the two viewing beam paths are identified by reference numerals 129a and 129b, respectively. In this embodiment too, the configuration of the stereomicroscope 101 shown is not essential to the invention; that is, especially another objective configured in another manner can be used. The light source of the autofocusing arrangement comprises here also a laser diode 106 which is followed downstream by a collimator optic 112 as well as a corresponding filter and/or attenuator 113. Alternatively, the intensity control can again be made directly via the current to the laser diode 106. The imaging of the parallel laser beam takes place likewise with the aid of a cylinder lens 108 which images a thin bar-shaped marking in the focal plane 114 of the cylinder lens 108. The optical axis of the projection beam path is identified by reference numeral 130. This thin bar-shaped marking is imaged via a further lens 109 and a deflecting element 110 by means of the object (104a, 104b) onto objective surface 111. The reflected beam is outcoupled after passing through the objective (104a, 104b) and projected onto the resolving position detector 118 via an outcoupling element 115, a projection lens 116 and a wavelength-dependent filter 117 in the same manner as in the embodiment of FIG. 1a.

The significant difference from the first embodiment is in the use of another pass-through pupil for the projection beam path through the objective (104a, 104b) used. In this embodiment, the projection beam path does not pass centrally through the objective (104a, 104b) but at the periphery. The projection beam path therefore intersects neither one of the two viewing beam paths.

Figure 2B:
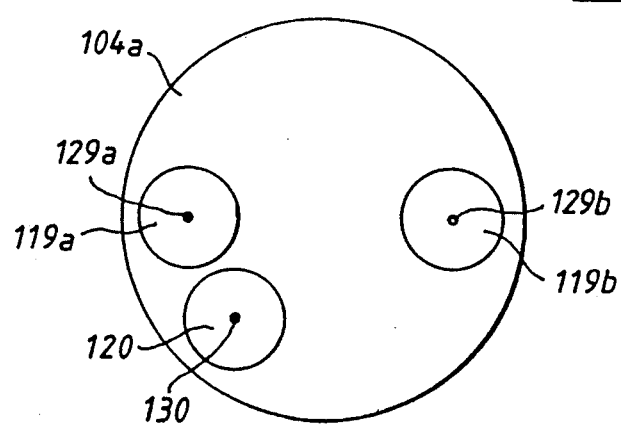
FIG. 2b is a plan view of the objective used and the corresponding beam paths of the second embodiment.

This becomes apparent in FIG. 2b where a plan view of the objective (104a, 104b) used is shown as well as the corresponding pass-through pupils for the two stereoscopic viewing beam paths (119a, 119b) as well as for the projection beam path 120. Likewise shown are again the optical axes of the stereoscopic viewing beam paths (129a, 129b) as well as the optical axis 130 of the projection beam path 130 and 120. The reflected beam is again coupled out of one of the two viewing beam paths (119a, 119b). With this selection of the projection and reflection beam path pass-through pupils, a base line for the triangulation as large as possible is ensured; that is, a large angle between the optical axes of projection beam path and reflection beam path. From this, a higher precision results with the triangulation and the corresponding focusing. In addition, the region below the objective center is available for various auxiliary means such as for surgical microscopes.

In the two embodiments described, a laser diode operating in the infrared spectral range is used as a light source. The reliable detection of the reflected beam is ensured in that a wavelength-selective outcoupling element is arranged in one of the two viewing beam paths and a filter with a corresponding transmission characteristic is arranged forward of the position detector. This filter ensures that only information of the reflected beam reaches the position detector.

The use of a radiation source is, however, also possible which emits in the visible spectral range.

Figure 3:
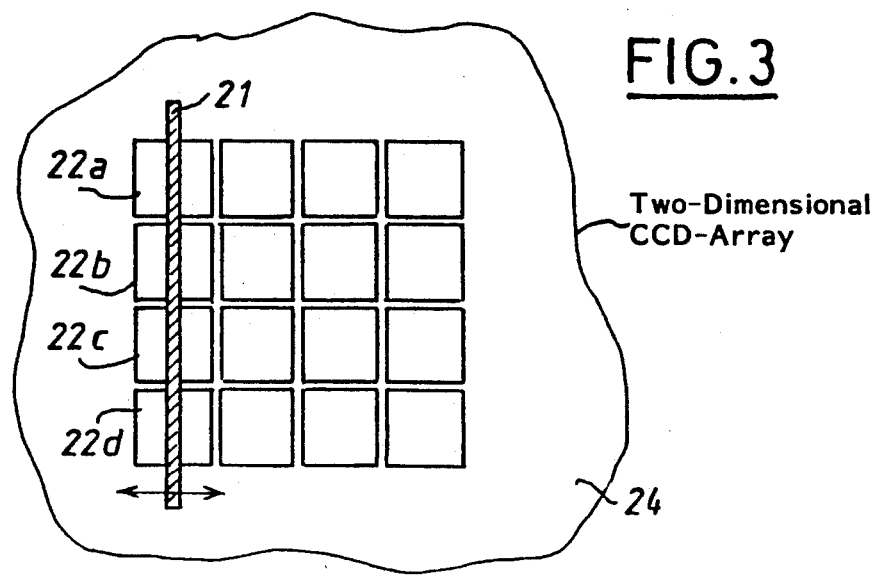
FIG. 3 shows the resolving position detector configured as a two-dimensional CCD-array; and, FIG. 4 is a schematic of the resolving position detector configured as a linear CCD-array.

In FIG. 3, a resolving position detector is shown configured as a two-dimensional CCD-array 24. An evaluation method for this autofocusing arrangement with the aid of the CCD-array 24 shown comprises first evaluating the individual element (22a, 22b, ... ) line by line to determine the exact position of the image 21 of the bar-shaped marking imaged on the CCD-array 24; that is, the radiation intensity incident on each element is determined. Thereafter, the radiation intensities of the individual elements (22a, 22b, ...) are averaged column-by-column. In this way, disturbing influences such as interference phenomena still present in the image 21 of the bar-shaped marking on the CCD-array 24 are equalized. On the other hand, the column-by-column evaluation of the radiation intensity incident on the individual elements (22a, 22b, ...) is likewise possible in order to thereafter average the measured radiation intensities line-by-line. The schematic representation of the image 21 of the bar-shaped marking on the CCD-array 24 is idealized in FIG. 3; that is, in reality, this image 21 has a Gaussian-shaped intensity profile along its transverse dimension.

Figure 4:
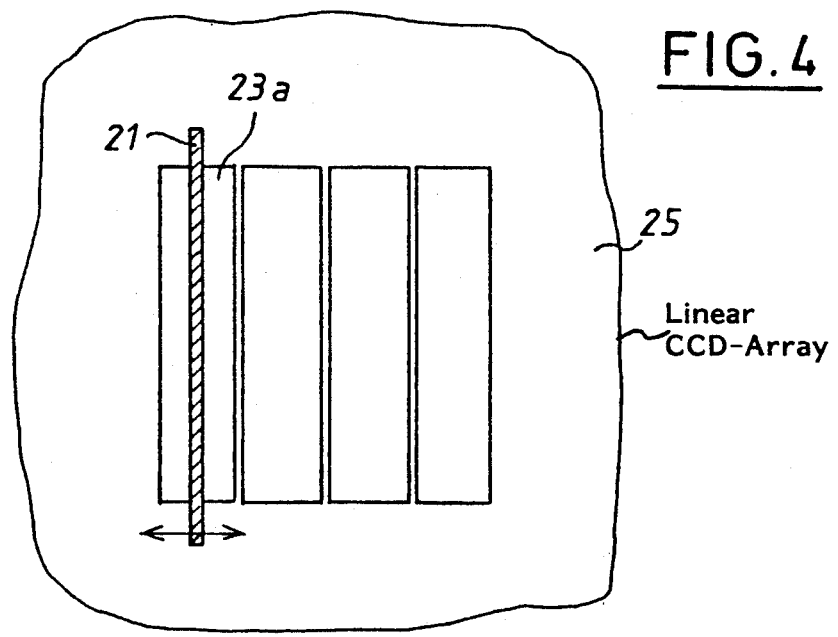

A further evaluation method for equalizing the disturbing influences when determining the position of the image 21 of the bar-shaped marking provides that a linear CCD-array 25 is used as a resolving position detector as shown in FIG. 4. The individual elements (23a, ...) of this linear CCD-array 25 define rectangular surfaces. The image 21 of the bar-shaped marking migrates during defocusing in the longitudinal direction of the linear CCD-array 25. For evaluation, the entire impinging intensity on one or more individual elements (23a, ...) is averaged in order to thereby preclude or minimize interference influences while precisely determining the position of the image 21 of the bar-shaped marking.

It is understood that the foregoing description is that of the preferred embodiments of the invention and that various changes and modifications may be made thereto without departing from the spirit and scope of the invention as defined in the appended claims.

What is claimed is:

1. An autofocusing arrangement for a stereomicroscope defining first and second viewing beam paths for viewing an object through an objective by utilizing only a selected region thereof leaving a remaining region thereof unused for the purpose of viewing the object via said beam paths, the autofocusing arrangement comprising:

light source means for supplying a projection beam defining a projection beam path;

said projection beam having a predetermined cross section;

optical focusing means for converting the entire cross section of said projection beam into a bar-shaped marking image;

said optical focusing means being disposed between said light source means and said objective;

collimating and deflecting means for imaging said bar-shaped image through said objective at said remaining region thereof and onto the object with at least one dimension having limited diffraction whereupon said projection beam is reflected from the object along one of said viewing beam paths;

outcoupling means arranged in said one viewing beam path for coupling the reflected projection beam out of said one viewing beam path;

a light-sensitive resolving position detector arranged downstream of said outcoupling means and including a plurality of elements producing a plurality of signals, respectively, indicative of a shift of said bar-shaped marking image and a defocusing of said stereomicroscope;

an evaluation unit for converting said signals into a drive signal for refocusing and stereomicroscope; and, focusing motor means for refocusing said stereomicroscope in response to said drive signal.

2. The autofocusing arrangement of claim 1, wherein said dimension is the width of said bar-shaped marking and is equal to or less than the resolution of said one viewing beam path.

3. The autofocusing arrangement of claim 1, said optical focusing means including at least one cylinder lens for imaging said projection beam into said bar-shaped marking image with limited diffraction.

4. The autofocusing arrangement of claim 1, said light source means comprising a laser diode for emitting laser light in the infrared spectral range.

5. The autofocusing arrangement of claim 1, said light source means comprising a spatially coherent light source for emitting spatially coherent light in the visible spectral range.

6. The autofocusing arrangement of claim 1, said objective defining a center axis; and, said optical focusing means being positioned so as to cause said projection beam path to pass through said objective along said center axis.

7. The autofocusing arrangement of claim 1, said remaining region including a peripheral area of said objective in said peripheral area.

8. The autofocusing arrangement of claim 1, wherein said projection beam path extends through said objective so as to define a first pass-through pupil and wherein the reflected projection beam defines a second pass-through pupil; said objective defining a plane and said pass-through pupils being disposed so as to cause a connecting line in said plane between said pupils to be as long as possible.

9. The autofocusing arrangement of claim 1, said light-sensitive resolving position detector being a two-dimensional CCD-array.

10. The autofocusing arrangement of claim 1, said light-sensitive resolving position detector including a plurality of individual elements; and, said bar-shaped marking image having a length dimensioned so as to cause said image to impinge upon several ones of said plurality of said individual elements.

11. The autofocusing arrangement of claim 1, said light-sensitive resolving position detector being a linear CCD-array.

12. The autofocusing arrangement of claim 1, said focusing motor means being operatively connected to said objective to effect a motorized change of the focus intercept of said objective.

13. The autofocusing arrangement of claim 1, said focusing motor means being adapted to effect a displacement of said stereomicroscope along said viewing beam paths.

14. The autofocusing arrangement of claim 1, wherein said light-sensitive resolving position detector includes a plurality of individual elements arranged in a grid configuration; and, wherein said evaluation unit is adapted to first determine the radiation intensity received by said individual elements and then averaging line-by-line over the intensities received by said individual elements.

15. The autofocusing arrangement of claim 1, wherein said light-sensitive resolving position detector includes a plurality of individual elements arranged in a grid configuration; and, wherein said evaluation unit is adapted to first determine the radiation intensity received by said individual elements and then to average column-by-column over the intensities received by said individual elements.

16. The autofocusing arrangement of claim 1, said light-sensitive resolving position detector including a plurality of individual elements receiving radiation intensity and each of said elements having a predetermined surface; and, wherein said evaluation unit is adapted to average the radiation intensity received by said individual elements over the entire surface of at least one of said elements.

* * * * *

UNITED STATES PATENT AND TRADEMARK OFFICE
CERTIFICATE OF CORRECTION

PATENT NO. : 5,288,987

DATED : February 22, 1994

INVENTOR(S) : Uwe Vry, Christian Lücke, Ulrich Sander, Werner Müller, Joachim Luber, Klaus Knupfer, Thomas Hellmuth, Rüdiger Duchateau and Harmut Wolf It is certified that error appears in the above-identified patent and that said Letters Patent is hereby corrected as shown below:

On title page, item [56] "References Cited, U.S. PATENT DOCUMENTS": delete
"4,447,717  5/9184  Nohda ...... 250/201.3" and substitute
-- 4,447,717  5/1984  Nohda ...... 250/201.3 therefor.

Col. 6, line 65, delete "and" and substitute --said--.

Col. 7, line 22, after "said", insert --objective; and, said optical focusing means positioned so as to cause said projection beam path to pass through said--.

Signed and Sealed this

Fifth Day of July, 1994

Attest:

BRUCE LEHMAN

*Attesting Officer*  *Commissioner of Patents and Trademarks*